United States Patent Office 3,706,558

Patented Dec. 19, 1972

3,706,558

PHOTOGRAPHIC METHOD FOR PRINTING VIEWING SCREEN STRUCTURE INCLUDING TREATMENT OF EXPOSED COATING BEFORE DEVELOPMENT

Harry Robert Frey, Lancaster, Pa., assignor to RCA Corporation

No Drawing. Filed Mar. 25, 1971, Ser. No. 128,193
Int. Cl. G03c 5/04
U.S. Cl. 96—27 E 10 Claims

ABSTRACT OF THE DISCLOSURE

Photographic method comprises (a) applying to a supporting surface for a viewing-screen structure a coating comprised of an organic binder and a dichromate photosensitizer for the binder, (b) exposing the coating to a pattern of actinic radiation, at least a portion of said coating being underexposed after completion of exposure, (c) wetting the exposed coating with a dilute aqueous solution of a mild reducing agent, such as hydroquinone, (d) and flushing the wet coating with an aqueous solvent to remove the unexposed portions of the coating while retaining the underexposed portions of the coating in place.

BACKGROUND OF THE INVENTION

This invention relates to a novel photographic method for printing a viewing-screen structure, particularly for an aperture-mask-type color-television picture tube.

A commercial color-television picture tube of the aperture-mask type is a cathode-ray tube which includes a screen structure comprised of a multiplicity of red-emitting, green-emitting and blue-emitting phosphor elements on the inner surface of the viewing window of a faceplate panel of the tube. Usually, these phosphor elements are arranged in groups of threes or triads in a regular pattern, each triad having a red-emitting dot, a green-emitting dot and a blue-emitting dot. An aperture mask (also called shadow mask), positioned in the panel in closely spaced relation with the phosphor elements, aids in selectively exciting the phosphor elements.

In order to make a television picture with suitable resolution and color purity, the process of forming the phosphor elements must be capable of producing a very large number of phosphor elements of relatively small and uniform size which are accurately positioned with respect to one another. The complexity of the problem is demonstrated by the fact that the screen structure may include more than a million closely-spaced or tangent phosphor dots.

In one process for printing the phosphor elements, the inner surface of the viewing window is coated with a mixture comprised of phosphor particles and a photosensitive binder. A typical photosensitive binder consists of a dichromatizable binder such as a polyvinyl alcohol and a dichromate sensitizer such as ammonium dichromate. Actinic radiation, e.g., light or electrons, is projected from a small area source through the aperture mask incident upon the coating. The mask functions as a photographic negative (or positive) to transmit a pattern of dots of radiation, which produces in the coating regions with greater solubility and regions with lesser solubility. The exposed layer is developed by flushing with an aqueous solvent, using, for example, an immersion or spray technique. The unexposed and substantially unexposed portions of the coating are removed by solvent action leaving the fully exposed portions adhered to the supporting surface. Underexposed portions are flushed away during development.

It is known that the size of the phosphor elements is determined in part by various parameters including the geometry of the parts of the system, the constitution of the coating, the exposure of the coating, and the development of the exposed coating. See, for example, N. R. Goldstein, "The Effect of Several Variables on Phosphor-Dot Size in Color Picture Tubes," RCA Review, 20 336–348 (1959).

With respect to the light exposure of the coating, the greater the total luminous flux per unit area incident on the coating, the larger will be the phosphor elements formed within a wide range of exposures. Since the phosphor elements are closely spaced, variations in the size of the phosphor elements may lead to problems in the operation of the tube. Overexposed portions of the coating may produce oversized elements which may overlap adjacent elements, producing color impurity in the video picture. Underexposed portions may produce elements which do not adhere to the supporting surface or may produce elements which may result in poor color purity and/or reduced brightness in the video picture. The exposure or "total luminous flux" per unit area is the summation of the incremental light intensities for each unit area during the entire exposure time.

There is considerable variation in exposure across the light field over a single viewing screen. This usually produces some regions that are underexposed; that is, receive less luminous flux than normally required for printing the screen structure. Underexposed image portions may occur in several ways. For example, (1) the entire light image may be underexposed; (2) or the image edges may be underexposed by a penumbra produced by light from a finite light source projected through a mask or stencil and a filter; (3) or the image edges may be underexposed by distortions or aberations in the optical system; (4) or the image edges may be underexposed by light scattering (diffusion) in the coating.

SUMMARY OF THE INVENTION

The novel method for printing a viewing-screen structure comprises (a) applying to a supporting surface a coating comprised of a dichromatizable organic binder such as polyvinyl alcohol, a dichromate photosensitizer therefor and, optionally, particles of screen-structure material; (b) exposing said coating to a pattern of actinic radiation, at least a portion of said coating being underexposed after completion of said exposing; (c) wetting the exposed coating with a dilute aqueous solution of a mild reducing agent, such as hydroquinone; and (d) flushing said wet coating with an aqueous solvent to remove the unexposed portions of said coating, while retaining the underexposed portions thereof in place.

By wetting the exposed coating prior to or during development of the coating with a dilute aqueous solution of a mild reducing agent, underexposed portions of the coating are retained in place after development is completed. The novel process may be used for retaining underexposed portions of the coating which were previously flushed away during development. Or, the exposure of the entire field may be shortened so that the entire coating is underexposed and yet, after development, the desired underexposed portions are retained as if the layer were fully exposed. The novel method may be used to improve the adherence of exposed portions of the screen structure in areas of high screen weight.

DETAILED DESCRIPTION OF SPECIFIC EMBODIMENT

Example

Prepare a coating composition of the following formulation:

| | Grams |
|---|---|
| Blue-emitting, silver-activated zinc sulfide phosphor | 125 |
| 10 weight percent aqueous solution of polyvinyl alcohol having an average molecular weight of about 170,000 to 220,000 | 138 |
| 10 weight percent aqueous solution ammonium dichromate | 11 |
| Deionized water | 268 |

The coating composition is carefully mixed and the viscosity adjusted to be in the range of about 10 to 80 centipoises. The formulation is then flow coated upon the inner surface of the faceplate of a 23-inch rectangular color-television picture tube and dried. The aperture mask for the faceplate is then inserted in the mounts provided therefor and the faceplate assembly positioned upon a lighthouse platform. Ultraviolet light from the small-area light source in the lighthouse is projected through the mask which permits a pattern of light to fall incident upon and to expose the coating for about 5 minutes. The faceplate panel is then removed from the lighthouse and the mask removed from the faceplate panel. The exposed coating is then wetted with a 0.5 weight percent aqueous solution of hydroquinone applied by spraying or fogging the solution onto the coating. With the coating still wet and preferably within about 10 seconds of the completion of applying the hydroquinone solution, the coating is developed by flushing with water to remove the unexposed and substantially unexposed portions of the coating while retaining the fully exposed and underexposed portions of the coating in place. By applying an aqeuous hydroquinone solution to the coating, normal-size phosphor dots are deposited with only about 65 percent of the light exposure normally required.

GENERAL CONSIDERATIONS

The novel method may be used to print various viewing screen structures by a photographic process. Dot screens and line screens are examples. By "viewing screen structure" is meant any component part of a viewing screen for a display device; for example, a luminescent layer, or a light-absorbing layer for a cathode-ray tube target. The novel process may be used to expose a layer comprised of photobinder-particles mixture, or to expose a clear photobinder, and then phosphor particles or light-absorbing particles may be deposited on the exposed areas. In the example, a phosphor-screen structure is deposited directly by exposing a layer comprised of phosphor particles mixed with a photobinder. An alternative method is to expose a layer of clear photobinder, then deposit phosphor particles thereon and then remove the more soluble portions of the photobinder and the overlying and/or embedded phosphor particles. Another method for preparing a phosphor screen structure is to expose a layer of clear photobinder, remove the more soluble portions thereof, then deposit phosphor particles thereover and finally remove the less soluble portions of the photobinder layer with the phosphor particles thereon and/or therein and leaving phosphor particles in the portions previously occupied by the more soluble portions of the photobinder layer. The novel process may also be used to produce nonluminescent screen structures, such as a light-absorbing matrix for example, as described in U.S. Patent No. 3,558,310 to E. E. Mayaud. An example of this method is to expose a clear photobinder layer to a light image, to remove the more soluble portions thereof, then to deposit light-absorbing particles such as fine-particle graphite thereover, then to remove the less soluble portions of the photobinder layer with the light-absorbing particles thereon and leave the light-absorbing particles in the portions previously occupied by the more soluble portions of the photobinder layer. Thus, the novel method may be used to photodeposit either luminescent or nonluminescent screen structures.

The example illustrates the use of the novel method to prepare a screen for a color-television picture tube by the slurry process. Many suitable coating formulations for the novel method applied to the slurry process are described in U.S. Patent No. 3,269,838 to T. A. Saulnier, Jr. Generally, the coating formulation is comprised of a dichromatizable organic binder, a dichromate photosensitizer for the binder, and particles of screen-structure material. The organic binder may be an organic colloid such as gelatin or glue, but is preferably polyvinyl alcohol having a molecular weight greater than about 120,000. The binder must be "dichromatizable"; that is, capable of being rendered photosensitive with dichromate ions. The photosensitizer may be any soluble dichromate such as sodium dichromate, potassium dichromate, or ammonium dichromate. The screen structure material may be, for example, luminescent material, inert material, or light-absorbing material, which is to be photodeposited as a screen structure. The coating may, if desired, include a nondichromatizable resin, such as an acrylate copolymer.

The coating is exposed in a lighthouse, and any actinic radiation such as visible light rays, ultraviolet light rays or cathode rays, may be used. Such equipment is described in the art. One suitable lighthouse using ultraviolet rays is described in U.S. patent application Ser. No. 844,852, filed July 25, 1969, by Harry R. Frey. A significant quality of the exposure is that at least a portion of the exposed area is underexposed. The normal necessary exposure is determined empirically to provide developed exposed areas of a prescribed size with adequate adherence to the supporting surface. With significantly smaller exposures; that is, with about 20 to 75 percent of the normal necessary exposure, the exposed areas after development are undersized and frequently exhibit such poor adherence to the supporting surface that they are flushed away during development.

After exposure, the coating is wetted with a dilute aqueous solution of a mild reducing agent such as hydroquinone, resorcinol, phloroglucinol, thiourea, or an alkali sulfite, typically sodium sulfite. By "dilute" is meant concentrations of about 0.01 to 1.0 weight percent and preferably about 0.1 to 0.5 weight percent. The solvent in the dilute aqueous solution of mild reducing agent may consist only of water or may include a portion of alcohol or other nonaqueous liquid that is miscible in water.

The effect of this solution is to act on the chromium ions in the same manner as a short flood actinic radiation exposure of the coating. This is believed to cause some hexavalent chromium ions in the coating to be converted to trivalent ions. However, if the solution is too concentrated or if the reducing agent is too active; that is, stronger than mild, there will remain after development spurious deposits of coating in areas that should be clear of coating material. By using a dilute solution of a mild reducing agent, the effect is just sufficient after development to bring the exposed areas up to size and to improve the adherence of the exposed areas to the supporting surface, without any substantial deposit of coating material in the unexposed areas. This permits shorter exposures to be used. Exposure techniques that use shadowing (as in the example) or projection usually have a penumbra along the margins of the lighted areas of the pattern of actinic radiation. This marginal region in the coating is usually underexposed and may be advantageously acted on by the novel method without adversely affecting the fully exposed or unexposed regions. As compared with using a short flood exposure, the novel method requires less labor, is more effective and is less difficult to control.

The solution may be applied to the coating by fogging, spraying, dipping, soaking, flushing, pouring, or other application techniques. The action of the reducing agent appears to be almost self-limiting. By one theory, the solution of reducing agent is applied to a dry coating, which takes up a limited amount of solution up to saturation. Any excess solution beyond this has essentially no effect on the exposed coating. The reducing solution may be applied as a separate step or as the initial portion of the development step.

The time that the solution of reducing agent is permitted to act on the exposed coating is not critical. Time variations may, however, cause minor variations in the effectiveness of the treatment. It is preferred that the development step start about 10 seconds or less after the completion of the wetting step. This permits suitable process control on automatically operating production equipment.

The development of the wet coating is conducted in the usual way by flushing the coating with an aqueous solvent, which may be deionized water with or without additives present. The flushing may be by dipping or spraying or other method of application which will carry away the unexposed areas of the coating and leave the exposed areas in place.

The following are some additional solutions of mild reducing agents which may be used in the novel method.

Hydroquinone solution.—Dissolve at room temperature 3.0 grams of photographic grade hydroquinone in 997 grams of demineralized water. The pH of the solution should be about 4.5 to 5.5.

Sodium sulfite solution.—Dissolve at room temperature 4.0 grams of chemically-pure grade anhydrous sodium sulfite in 996 grams of demineralized water. The pH of the solution should be about 9.0 to 10.0.

Thiourea solution.—Dissolve at room temperature 6.0 grams of reagent-grade thiourea in 994 grams of demineralized water. The pH of the solution should be about 6.0 to 7.0.

Resorcinol solution.—Dissolve at room temperature 7.0 grams of reagent-grade resorcinol in 993 grams of demineralized water. The pH of the solution should be about 5.0 to 6.0.

Phloroglucinol solution.—Dissolve at room temperature 8.0 grams of reagent-grade phloroglucinol in 992 grams of demineralized water. The pH of the solution should be about 4.5 to 5.5.

There are patents in the photographic art which disclose processes which bear a resemblance to the novel method, but which are distinguishable. For example, U.S. Patent No. 2,656,271 to W. Neugebauer et al, discloses a process comprising applying a developing solution containing a reducing agent such as hydroquinone to an exposed coating comprised of a bichromated colloid, such as bichromated glue, and a silver halide. In the Neugebauer et al. process, the reducing agent acts on the silver halide to intensify the silver image during development. In the novel method, there is no silver halide present and the reducing agent acts upon the chromium ions. U.S. Patent No. 2,830,899 to C. A. Brown discloses a process comprising developing an exposed coating comprised of bichromated polyvinyl alcohol; and then treating the developed image with a solution of a reducing agent from a class of aromatic dyes. The Brown process is used for a different purpose; that of increasing the acid resistance of the developed exposed coating. In the Brown process, the reducing agent acts directly upon the polyvinyl alcohol and not upon the chromium ions as evidenced by the fact that the reducing agent is applied after the coating is developed, instead of before development as in the novel process.

I claim:

1. A photographic method for printing a viewing-screen structure upon a supporting surface comprising:

(a) applying to said supporting surface a coating comprised of a dichromatizable organic binder and a dichromate photosensitizer for said binder and then drying said coating, (b) exposing said dry coating to a pattern of actinic radiation, at least a portion of said coating being underexposed after completion of said exposing, (c) wetting said exposed dry coating with a dilute aqueous solution of a mild reducing agent, (d) and then flushing said wet coating with an aqueous solvent to remove the unexposed portions of said coating while retaining the underexposed portions of said coating in place.

2. The method defined in claim 1 wherein the underexposed portion of said coating receives about 20 to 75 percent of the exposure normally required for printing said viewing-screen structure.

3. The method defined in claim 1 wherein said dichromatizable organic binder is a polyvinyl alcohol.

4. The method defined in claim 3 wherein said mild reducing agent is selected from the group consisting of hydroquinone, resorcinol, phloroglucinol, thiourea, and alkali metal sulfite.

5. The method defined in claim 3 wherein said mild reducing agent is hydroquinone and is present in said solution in concentrations of about 0.01 to 1.0 weight percent.

6. A method for printing a phosphor-viewing-screen structure for a cathode-ray tube upon a supporting surface comprising:

(a) applying to said supporting surface a coating comprised of polyvinyl alcohol, a dichromate photosensitizer for said alcohol, and particles of phosphor for said screen structure and then drying said coating, (b) projecting a pattern of actinic light upon said dry coating, thereby reducing the solubility of the exposed portions of said coating, the exposure of at least some portions of said coating being less than that exposure normally required for printing said screen structure, (c) wetting said exposed dry coating with a dilute aqueous solution of a mild reducing agent selected from the group consisting of hydroquinone, resorcinol, phloroglucinol, thiourea, and alkali metal sulfite, (d) and then, after a delay of up to about ten seconds after the completion of step (c), flushing said wet coating with an aqueous solvent to remove the unexposed portions of said coating while retaining the underexposed portions of said coating in place.

7. The method defined in claim 6 herein the underexposed portions of said coating receive about 20 to 75 percent of the exposure normally required to photodeposit said screen structure.

8. The method defined in claim 6 wherein said reducing agent is present in said solution in concentrations of about 0.1 to 1.0 weight percent.

9. The method defined in claim 6 wherein said reducing agent is hydroquinone and is present in said solution in concentrations of about 0.1 to 0.5 weight percent.

10. The method defined in claim 6 wherein step (d) is carried out within 10 seconds after the completion of step (c).

References Cited

UNITED STATES PATENTS

| | | | |
|---|---|---|---|
| 3,269,838 | 8/1966 | Saulnier | 96—36.1 |

OTHER REFERENCES

Kosar: "Light Sensitive Systems," Wiley & Sons, 1965, p. 93.

J. TRAVIS, BROWN, Primary Examiner

E. C. KIMLIN, Assistant Examiner

U.S. Cl. X.R.

96—36.1

UNITED STATES PATENT OFFICE
CERTIFICATE OF CORRECTION

Patent No. 3,706,558 Dated December 19, 1972

Inventor(s) Harry Robert Frey

It is certified that error appears in the above-identified patent and that said Letters Patent are hereby corrected as shown below:

| | |
|---|---|
| Column 2, line 63 | after "or during" insert --the initial portion of-- |
| Column 6, line 15 | before "photographic method" change "A" to --In a-- |
| Column 6, line 20 | after "said coating," insert --and,-- |
| Column 6, line 23 | after "said exposing," insert --the improvement wherein, in order to retain the underexposed portions of the coating, the development comprises,-- |
| Column 6, line 26 | after "and then" insert --, after a delay of up to about ten seconds after the completion of step (c),-- |
| Column 6, line 44 | before "method" change "A" to --In a-- |
| Column 6, line 51 | after "said coating," insert --and,-- |
| Column 6, line 57 | after "screen structure," insert --the improvement wherein, in order to retain the underexposed portions of the coating, the development comprises,-- |

Signed and sealed this 1st day of May 1973.

(SEAL)
Attest:

EDWARD M. FLETCHER, JR.
Attesting Officer

ROBERT GOTTSCHALK
Commissioner of Patents